US011709131B2

(12) United States Patent
Schoegl

(10) Patent No.: US 11,709,131 B2
(45) Date of Patent: *Jul. 25, 2023

(54) SYSTEM AND METHOD FOR FOCUSING COLOR SCHLIEREN DIAGNOSTICS

(71) Applicant: Ingmar Schoegl, Baton Rouge, LA (US)

(72) Inventor: Ingmar Schoegl, Baton Rouge, LA (US)

(73) Assignee: BOARD OF SUPERVISORS OF LOUISIANA SATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/095,392

(22) Filed: Nov. 11, 2020

(65) Prior Publication Data

US 2021/0080389 A1 Mar. 18, 2021

Related U.S. Application Data

(63) Continuation of application No. 15/860,978, filed on Jan. 3, 2018, now Pat. No. 10,866,186.

(Continued)

(51) Int. Cl.
*G01N 21/45* (2006.01)
*H04N 17/02* (2006.01)
(Continued)

(52) U.S. Cl.
CPC ........... *G01N 21/455* (2013.01); *H04N 17/02* (2013.01); *G01F 1/661* (2013.01); *G01N 21/274* (2013.01)

(58) Field of Classification Search
CPC .... G01F 1/661; G01N 21/455; G01N 21/274; H04N 17/02
(Continued)

(56) References Cited

U.S. PATENT DOCUMENTS 4,779,024 A 10/1988 Roussin
6,312,134 B1 11/2001 Jain et al.
(Continued)

OTHER PUBLICATIONS

Schoegl et al. (Development of a compact focusing color Schlieren technique, AIAA SciTech Forum, Jan. 4-8, 2016, San Diego, 54th AIAA Aerospace Sciences Meeting (Year: 2016).*

(Continued)

*Primary Examiner* — Sunghee Y Gray
(74) *Attorney, Agent, or Firm* — Venable LLP; Keith G. Haddaway; Ryan T. Ward

(57) ABSTRACT

Embodiments of the present application are directed toward a focusing Schlieren technique that is capable of adding color-coded directional information to the visualization of density gradients. Other advantages of the technique can include that it does not require manual calibration, has a simple design and is sensitive enough to be used in compact experimental setups. Certain embodiments include the use of a color-coded source image that replaces the conventional source grid. The technique may benefit from a computer-controlled digital background, which is used for both illumination and display of color-coded source images.

7 Claims, 13 Drawing Sheets

(8 of 13 Drawing Sheet(s) Filed in Color)

Related U.S. Application Data

(60) Provisional application No. 62/441,798, filed on Jan. 3, 2017.

(51) Int. Cl.
  *G01F 1/661* (2022.01)
  *G01N 21/27* (2006.01)

(58) Field of Classification Search
  USPC .................................................. 356/128–137
  See application file for complete search history.

(56) References Cited

U.S. PATENT DOCUMENTS

| | | | |
|---|---|---|---|
| 6,907,124 B1* | 6/2005 | Gluckstad | H04K 1/00 380/58 |
| 2004/0070815 A1* | 4/2004 | Aubuchon | G02B 26/0841 359/291 |
| 2010/0310130 A1* | 12/2010 | Beghuin | G01M 11/0264 382/106 |
| 2014/0267781 A1 | 9/2014 | Buckner et al. | |

OTHER PUBLICATIONS

Agrawal, A. K., et al. "Three-dimensional Rainbow Schlieren Tomography of a temperature field in gas Flows," Appl. Optics, 37:479-485 (1998).

Al-Ammar, K., e al. "Application of Rainbow Schlieren Deflectometry for concentration measurements in an axisymmetric helium jet," Exp. Fluids, 25:89-95 (1998).

Atcheson, B., et al. "Imaging and 3D tomographic reconstruction of time varying, inhomogeneous refractive index fields," Tech. Rep. UBC CS TR-2007-06, pp. 1-9, The University of British Columbia (2007).

Buckner, B. D., et al. "Digital Focusing Schlieren Imaging," Proc. SPIE 9576, Applied Advanced Optical Metrology Solutions, p. 95760C, Sep. 2015.

Elsinga, G. E., et al. "Assessment and application of quantitative schlieren methods: calibrated color schlieren and background oriented schlieren," Exp. Fluids, 36:309-325 (2004).

Fagan, A. F., et al. "Application of a Novel Projection Focusing Schlieren System in NASA Test Facilities," 30th AIAA Aerodynamic Measurement Technology and Ground Testing Conference, pp. 1-15 (2014).

G.E. Elsinga, PhD Thesis TU Delft, "Tomographic particle image velocimetry and its application to turbulent boundary layers" aerospace engineer, The Netherlands pp. 1-142 (2009).

Greenberg, P. S., et al. "Quantitative rainbow schlieren deflectometry," Appl. Opt., 34 (19):3810-3825 (1995).

Hargather, M. J., et al. "A comparison of three quantitative schlieren techniques," Optics and Lasers in Engineering, 50:8-17 (2012).

Ibarreta, A. F., et al. "Flame temperature and location measurements of sooting premixed Bunsen flames by rainbow schlieren deflectometry," Appl. Opt., 44: 3565-3575 (2005).

Ibarreta, A. F., et al. "Burning velocity measurements of microgravity spherical sooting premixed flames using rainbow schlieren deflectometry," Combust. Flame, 140:93-102 (2005).

Ihrke, I. et al., "Image-based Tomographic Reconstruction of Flames," Proceedings of the 2004 ACM SIGGRAPH/Eurographics Symposium on Computer Animation, SCA '04, Eurographics Association, Aire-la-Ville, Switzerland, pp. 365-373 (2004).

Schoegl et al., "Development of a compact focusing color Schlierent technique", AIAA Sci Tech Forum, Jan. 4-8, 2016, San Diego, 54th AIAA Aerospace Sciences Meeting.

Settles, G., "Schlieren & Shadowgraph Techniques" Springer, pp. 25-140, 263-278, Spring (2006).

Wetzstein et al., "Hand-Held Schlieren Photography with Light Field Probes," IEEE International Conference on Computational Photography, pp. 1-8 (2011).

\* cited by examiner

SYSTEM AND METHOD FOR FOCUSING COLOR SCHLIEREN DIAGNOSTICS

The present disclosure is a continuation of U.S. patent application Ser. No. 15/860,978, filed Jan. 3, 2018, which claims priority to U.S. Provisional Patent Application 62/441,798, filed Jan. 3, 2017, the contents of which are incorporated herein by reference in their entirety.

This invention was made with government support under grant number NNX13AB14A awarded by NASA. The government has certain rights in the invention.

BACKGROUND

1. Technical Field

The field of the currently claimed embodiments of this invention relates to systems and methods for manipulating light. In particular some embodiments relate to systems and methods for Schlieren imaging.

2. Discussion of Related Art

Despite having been introduced more than 150 years ago, Schlieren imaging has not lost its role as an essential diagnostic tool for visualizations of reacting flows, high speed flows, convective effects and turbulence. Schlieren imaging uses refraction of light to visualize density gradients, which carry crucial information on fluid flow but are virtually invisible to the naked eye. The diagnostic technique has a long history in aerospace and combustion, where it is applicable to any type of situation where gradients of the refractory index are present.

Schlieren systems can be divided into two broad categories: point-source/knife-edge systems and lens-and-grid systems. The first category uses well defined light beams (aka collimated light, having parallel beams or fan beams) integrate beam deflections across an entire test section. The second category uses a single lens and non-parallel beams originating from an illuminated source image. From these two broad categories, four methods of performing Schlieren imaging have been developed. Methods 1 and 2 use background distortion of single and multiple light/dark edges on a background. The apparent discontinuous illumination is avoided in method 3, which uses a substantially larger spacing in the grid background, but as a result is limited to test objects with large differences in refractive indices. Finally, method 4 adds a Schlieren cutoff (i.e., a grid or pattern) that serves the same purpose as a knife-edge, namely allowing visualization of bent light. Method 4 has found widespread application in modern focusing Schlieren systems, whereas method 2 forms the basis for recent advances in background-oriented Schlieren (BOS) diagnostics.

SUMMARY

A focusing Schlieren system has several advantages over knife-edge methods: (a) it involves fewer components, (b) the test section size can be much larger, and (c) the built-in focusing effect creates a limited depth of field (focus), which is advantageous in many imaging applications. Focusing Schlieren systems rely on the exact alignment of two grids, where one is integrated within the Schlieren optics and one is external. Schlieren images are created by shifts in beam paths due to refraction between source grid and cutoff grid. Conventional focusing techniques use two fixed grids, where the external (source) grid is created first, and the internal (cutoff) grid was traditionally obtained by exposing diapositive photographic film in place to guarantee exact correspondence of the two grids. Accordingly, there exists a need for more effective calibration of focusing Schlieren systems.

Furthermore, while most Schlieren techniques are monochrome and qualitative in nature, color coded ("rainbow") Schlieren deflectometry methods, such as those disclosed herein, add quantitative information on beam deflection in a calibration-based approach via look-up tables for hue. A more comprehensive treatment of refractive phenomena can use optical flow algorithms, where a rigorous derivation was developed in the context of background oriented Schlieren (BOS) imaging. A comparison of quantitative Schlieren techniques concludes that color-coded rainbow Schlieren and BOS can produce equivalent results. However, there exists a need for an alternative Schlieren technique, such as that disclosed herein, where both direction and magnitude of ray deflection can be quantified.

An exemplary method for performing the concepts disclosed herein can include: creating a test area between an imaging lens and a source image, wherein said source image comprises a digital visual media display capable of providing light; placing a two dimensional cutoff image between the imaging lens and a sensor plane; collecting visual data with the sensor plane; and calibrating a display for the source image based on the visual data from the sensor plane.

An exemplary system for performing the concepts disclosed herein can include: a source image comprising a digital visual media display capable of providing light; an imaging lens; a test area located between the imaging lens and the source image; a two dimensional cutoff image located between the imaging lens and a sensor plane; a processor; and a non-transitory computer-readable storage medium having instructions stored which, when executed by the processor, cause the processor to perform operations comprising: collecting visual data with the sensor plane; and calibrating a display for the source image based on the visual data from the sensor plane.

An exemplary non-transitory computer-readable storage medium as disclosed herein can have instructions which, when executed by a computing device, can cause the computing device to perform operations including: collecting visual data with a sensor plane, the visual data associated with light received from a source image, the light passing sequentially from the source image through a test area, an imaging lens, and a cutoff pattern before being received at the sensor plane; and calibrating a display for the source image, the source image comprising a digital visual media display capable of providing the light, based on the visual data from the sensor plane.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further objectives and advantages will become apparent from a consideration of the description, drawings, and examples.

DETAILED DESCRIPTION

Figure 1:
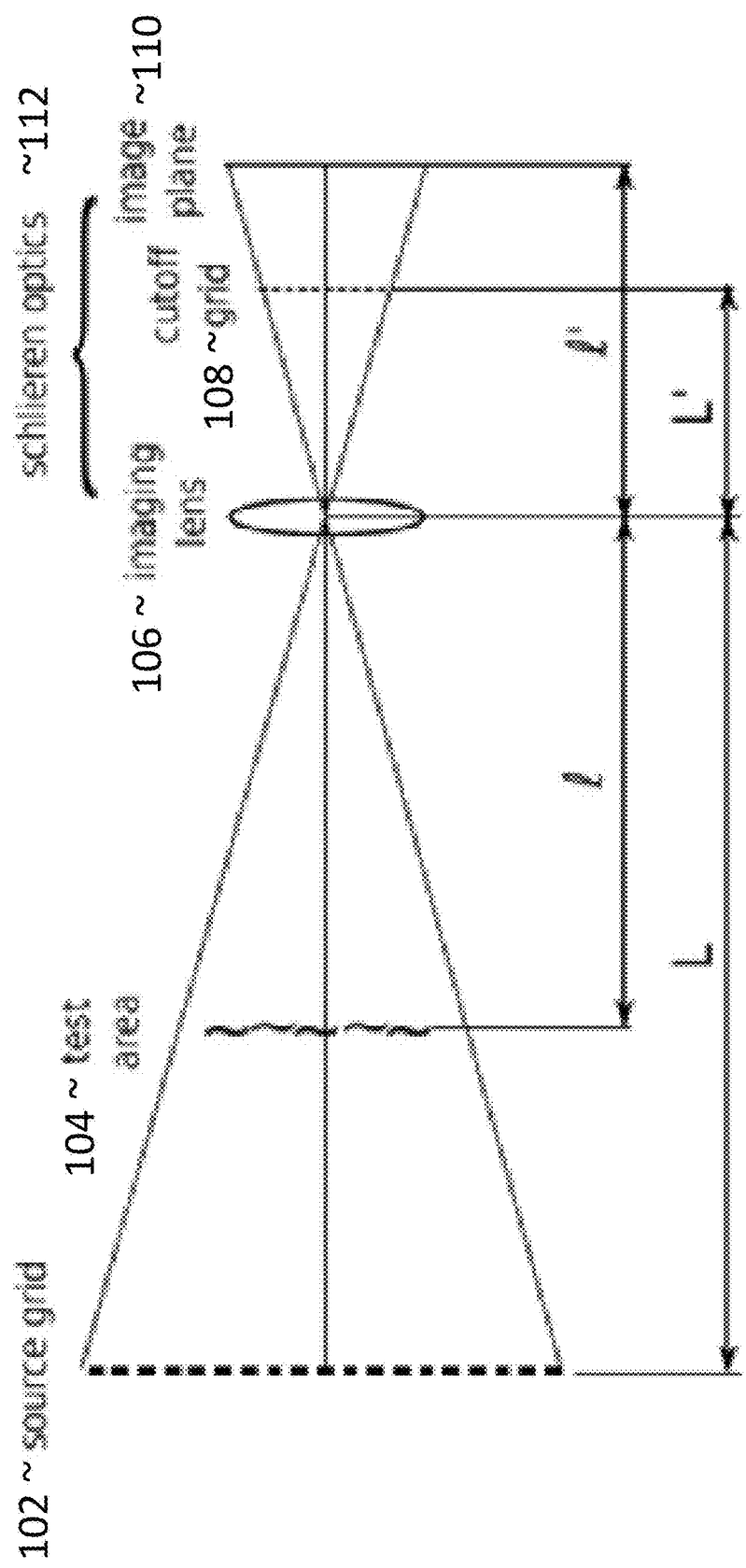
FIG. 1 is an exemplary schematic illustration of a generic focusing Schlieren setup.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention.

The term "light" as used herein is intended to have a broad meaning that can include both visible and non-visible regions of the electromagnetic spectrum. For example, visible, near infrared, infrared and ultraviolet light are all considered as being within the broad definition of the term "light."

The term "digital visual display media" as used herein is intended to have a broad meaning that can include any device which can display at least one image controlled or generated by a processor. Examples of digital visual display media include but are not limited to monitors, projectors, handheld devices, or digitally calibrated images printed on (or transferred to) suitable background media.

The term "monochromatic" as used herein is intended to have a broad meaning including light which appears within a narrow band of wavelengths or any embodiment that is not selective to individual components of a color or hue obtained by additive color mixing. In embodiments which contain white light, the white light is considered to be its own color, i.e., monochromatic. In general monochromatic may refer to any light which consists of one color or hue.

The new diagnostic Schlieren technique disclosed herein, e.g., Focusing Color Schlieren (FCS), the cutoff and source grids found in traditional Focusing Schlieren setups are replaced, respectively, by a two-dimensional cutoff pattern and a color-coded source image, which yields directional information. Further, an overlay grid improves the contrast of FCS images, but is not required. While the primary objective of the technique is to provide directionally color-coded information, two-dimensional cutoff patterns still allow for monochrome imaging.

It is noted that the FCS approach differs from both conventional color Schlieren (knife-edge) and Background Oriented Schlieren (BOS). Specifically, systems configured as disclosed herein can use a focusing technique with a cutoff image, whereas prior color Schlieren methods are based on Toepler's knife-edge approach, and BOS relies exclusively on background distortion and does not include an internal Schlieren cutoff. Two significant differences to previous focusing Schlieren techniques may be that the cutoff grid is replaced by a two-dimensional cutoff image, and that the black-and-white source grid is replaced by a color-coded source image. Further, the use of digital visual display media creates a highly flexible diagnostic technique.

A significant simplification of any focusing Schlieren method is obtained by turning the traditional calibration process around: using a fixed internal cutoff grid, the external source grid is displayed on a computer-controlled digital background (either monitor, projector, or handheld device). Integrating camera and screen, the digital source grid can be exactly matched to the fixed cutoff grid by a suitable software algorithm, which still relies on conventional cutoff and source grids (e.g. Ronchi rulings) for monochrome imaging.

Focusing Color Schlieren (FCS), as disclosed herein, involves the same physics as conventional focusing Schlieren techniques, illustrated in FIG. 1. Specifically, focusing Schlieren setups may be characterized by a simple design: the main components are a source grid 102, the test area 104, and Schlieren optics 112 including an imaging lens 106, a cutoff grid 108, and an image plane 110, which are respectively separated by L, l, L', and l' distances. The key to the technique is the simultaneous use of two focal planes, where the source grid is focused on the cutoff grid, and the test area is focused on the image plane. Focusing Schlieren may use an imaging lens 106 with a shallow depth of field (e.g. long/fast lens), and exact calibration of the two grids. In the simplest case, the cutoff grid 108 is an exact image of the source grid 102, where due to lens blur neither is visible on the image plane 110. Ray refraction in the test area results in darkened and/or brightened regions, where sharp Schlieren images emerge within the depth of field.

Figure 2:
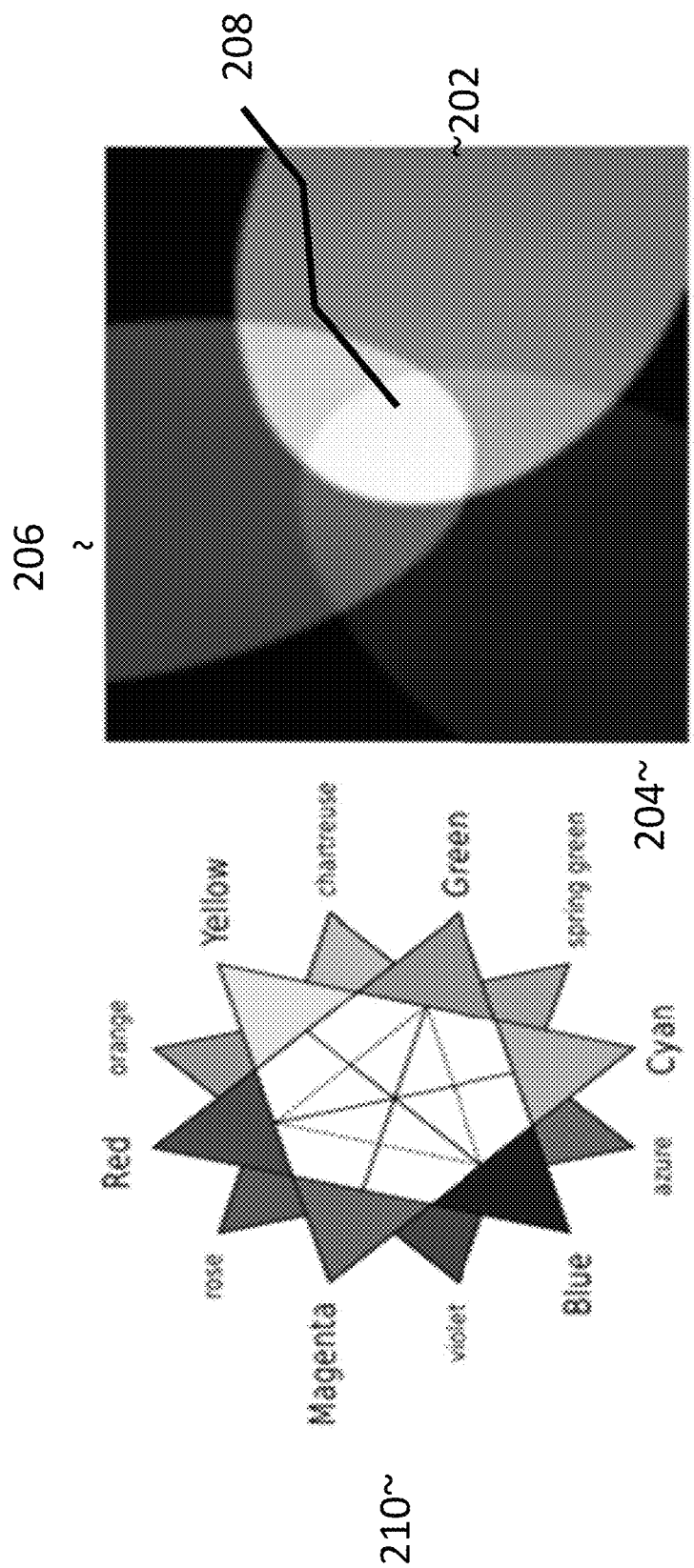
FIG. 2 shows a color star illustrating the standard RBG scheme (left); light of complementary color (180° shift) mixes to white according to additive color mixing rules (right)

In the Focusing Color Schlieren (FCS) technique disclosed herein, the cutoff grid 108 and source grid 102 can be replaced by a two-dimensional cutoff pattern and a color-coded source image, respectively. The underlying idea uses additive color mixing of complementary colors as illustrated in FIG. 2, which features primary colors (red 206/green 202/blue 204) combined to form white 208, secondary colors (cyan/magenta/yellow), and tertiary colors (all others). The color star 210 illustrates the standard RBG (red/blue/green) scheme (left) while light of complementary color (180° shift) mixes to white according to additive color mixing rules (right).

Figure 3:
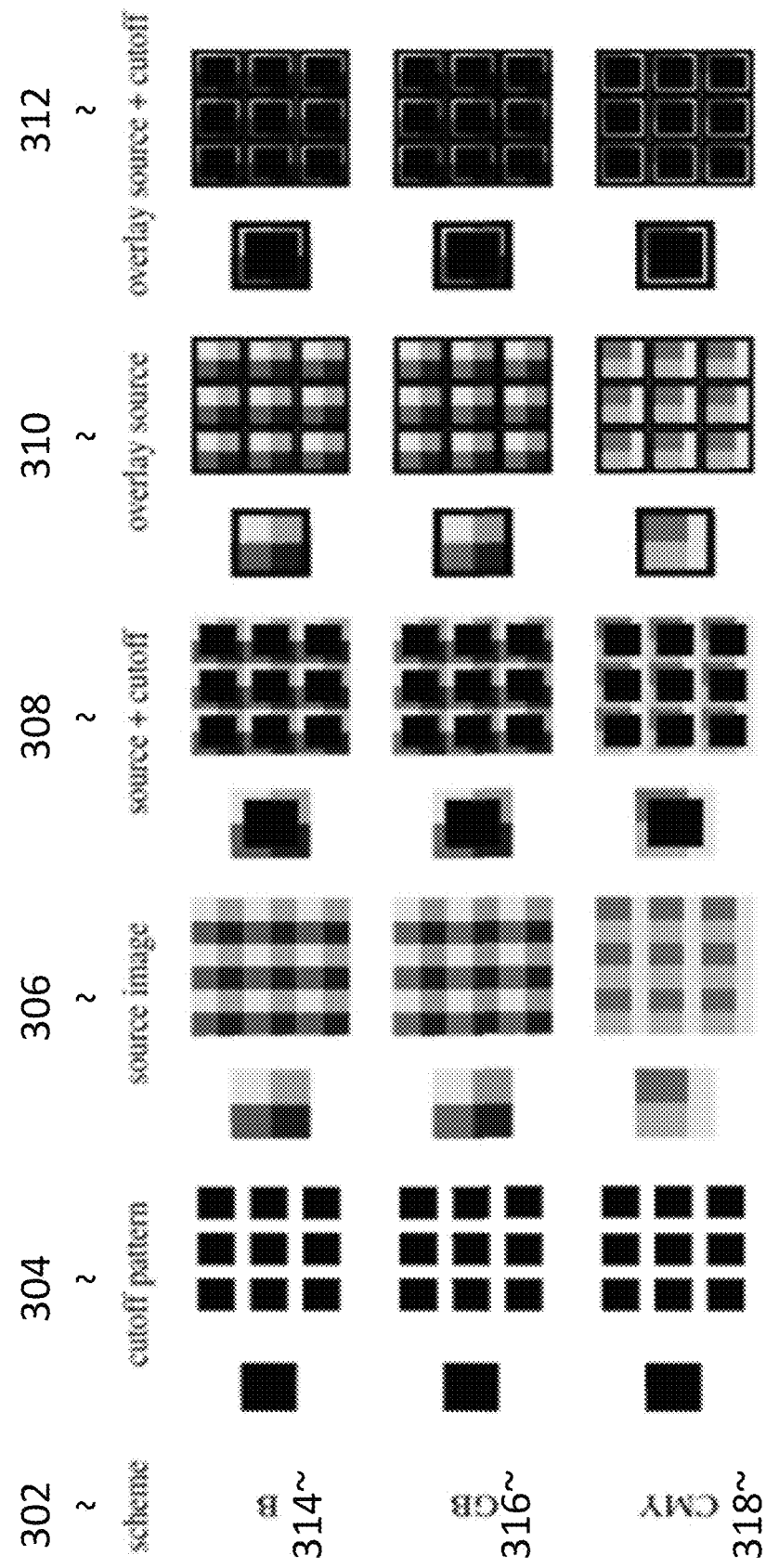
FIG. 3 shows exemplary cutoff patterns and source images for color schemes used in embodiments of the present invention.

FIG. 3 shows exemplary cutoff patterns and source images for color schemes used in the present invention, and further details three color schemes 302 used in the present work—B 314, GB 316, and CMY (Cyan, Magenta, and Yellow) 318—that are based on rectangular cutoff patterns 304. In other configurations, the cutoff pattern 304 can be other shapes, such as circles, triangles, hexagons, parallelograms, etc. As illustrated, schemes B and GB use four colors for the construction of a source image 306 from square unit cells that are matched to the source pattern. In scheme B 314, blue/rose/yellow/spring green represent pairs of complementary colors 90° offset from one another on the color star. The GB scheme 316 uses a skewed scheme with blue/magenta/yellow/green, which avoids the use of tertiary colors. The third scheme (CMY) 318 uses all three secondary colors in the source image, which results in a brighter image.

The first three columns in FIG. 3 show the cutoff pattern 304, the source image 306, and their combination 308, respectively. While not required, the use of an overlay grid combined with the source image ("overlay source") 310 can enhance the contrast in images formed by deflected beams. Here, the contrast percentage quantifies darkening of image portions not obstructed by the cutoff pattern. Accordingly, 0% contrast describes a source image without an overlay grid (i.e., column 306), whereas for 100% contrast, the overlay grid completely blocks areas not obstructed by the cutoff pattern. As illustrated in the examples shown in column 312, combining the overlay source 310 with the source+cutoff 308 results in a small amount of color escaping between the overlay source and the cutoff.

Cutoff patterns and source images have no direct comparison in conventional focusing Schlieren, with the exception of 100% contrast, where the overlay grid shares characteristics with the dark field configuration. Accordingly, monochrome versions are easily constructed without changing the cutoff pattern: for example, using a 100% contrast overlay grid or its negative without including color-coded image information results in dark field Schlieren and bright field Schlieren, respectively. Likewise, bipolar Schlieren has multiple implementations due to the two-dimensional nature of the cutoff pattern.

Figure 9A:
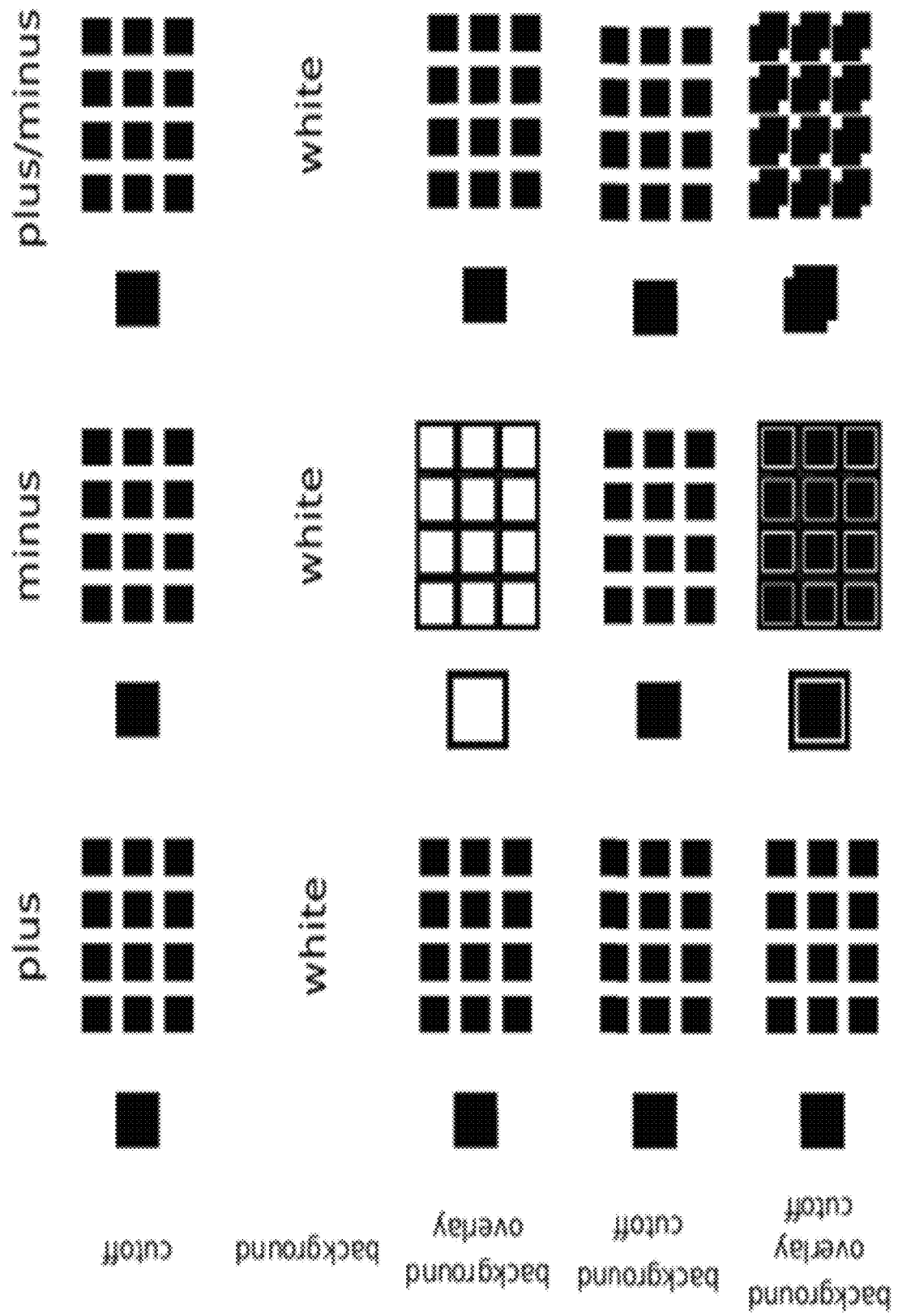
FIGS. 9A, 9B, and 9C show alternate cutoff patterns and source images.
Figure 9B:
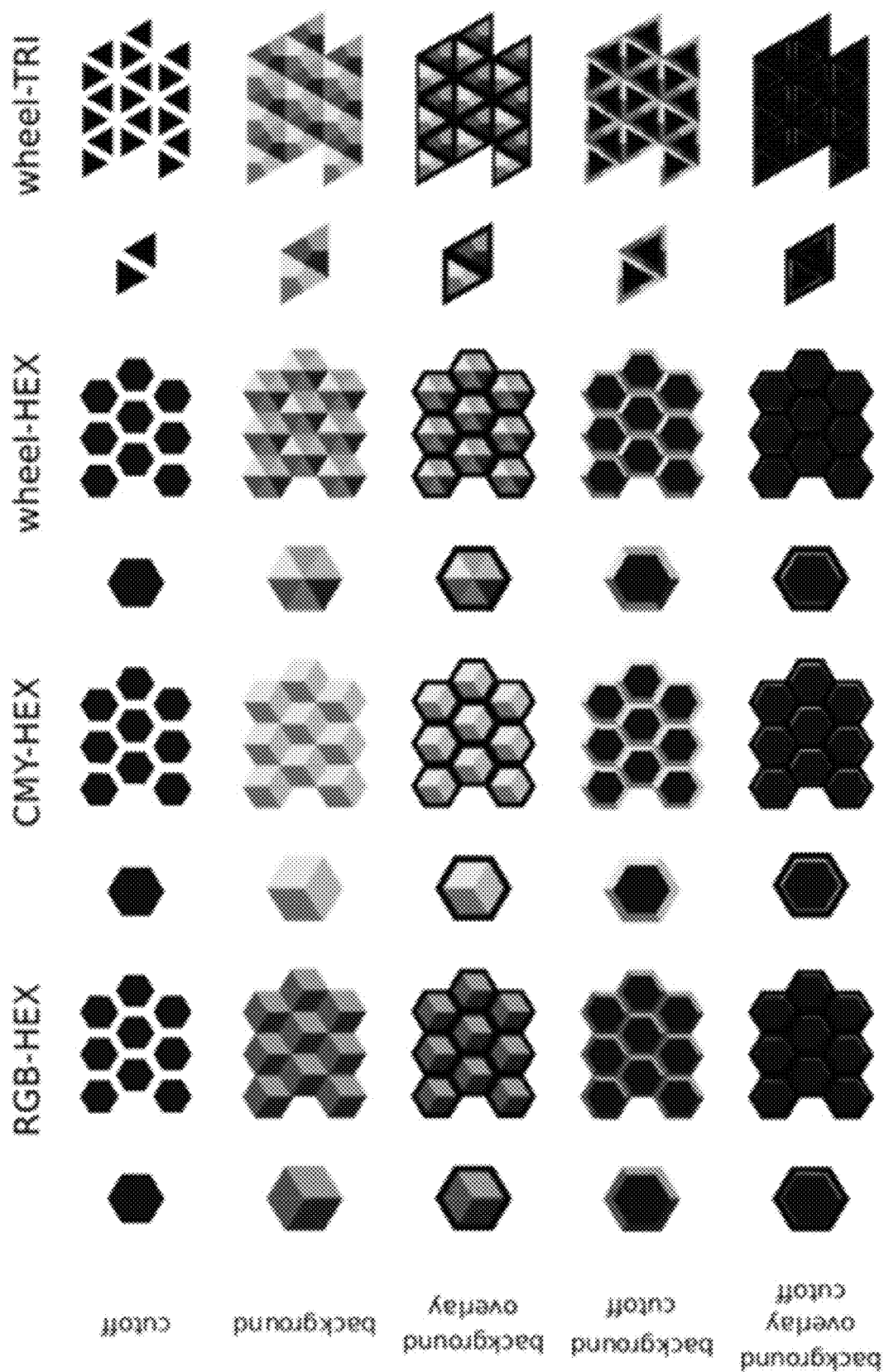
Figure 9C:
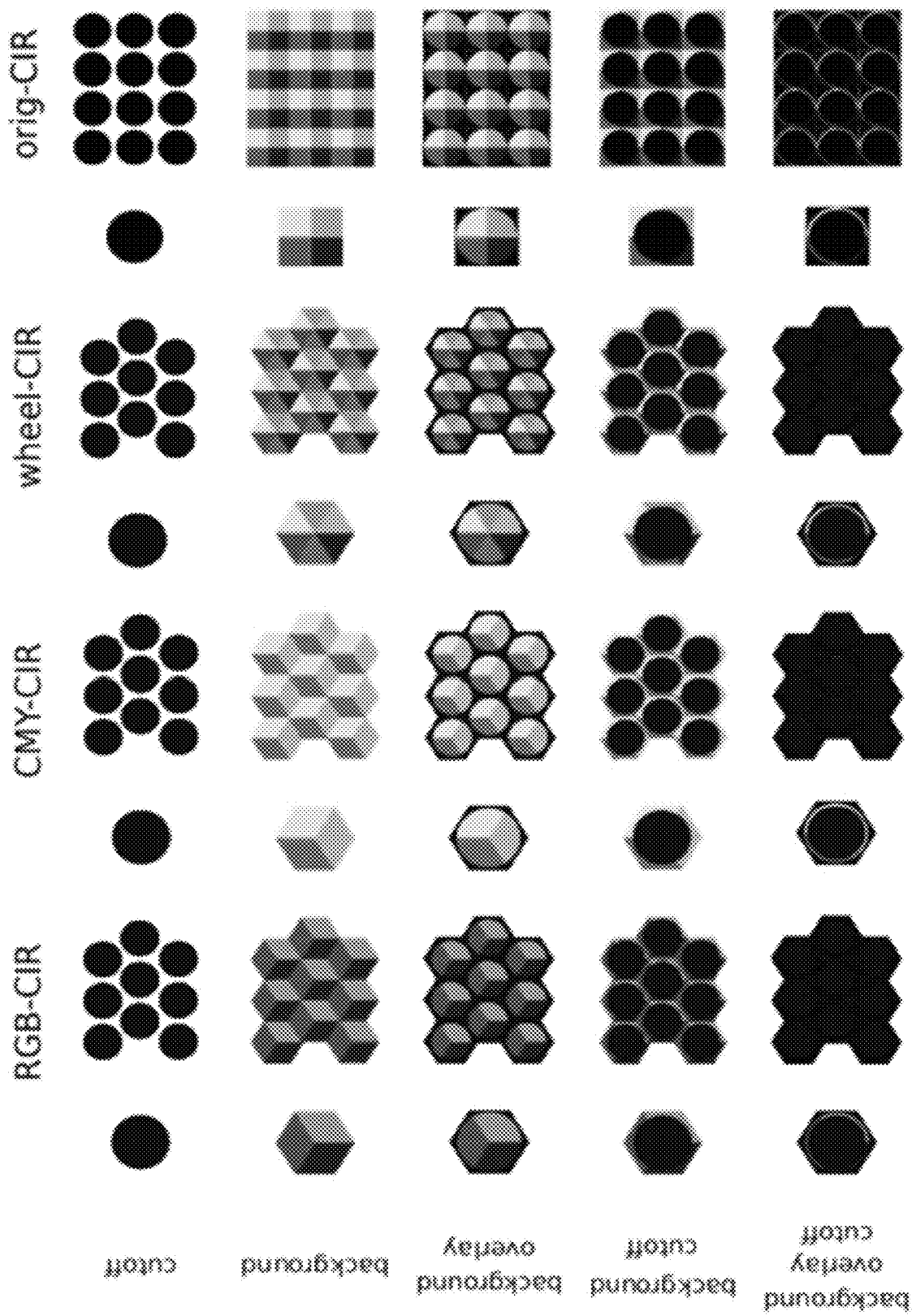

FIGS. 9A, 9B, and 9C illustrate alternate cutoff patterns and source images. FIG. 9A shows versions of monochromatic system embodiments. The plus system shows a white background and square pattern for the source image and cutoff pattern. The minus system is a variation of the plus system, which includes the source image as negative of the cutoff pattern, e.g., the source pattern is an overlay. Finally, the plus/minus system uses two square patterns, one on the source image and one as the cutoff pattern, each offset from one another. As a person of ordinary skill in the art would recognize, other variations of cutoff patterns/grids and source images may be used. For example, FIG. 9B illustrates the use of both a hexagonal pattern and triangular pattern, while FIG. 9C shows the use of a circular pattern.

Systems configured according to this disclosure can use a variety of backgrounds, and exemplary backgrounds are shown in FIGS. 9B and 9C. In creating the background, a plurality of colors may be within one pattern section, e.g., one square as defined by the pattern. In preferred configurations, the respective colors used in the background are offset from one another by 180, 120 or 60 degrees on the RGB wheel. In other configurations, the colors are organized such that each color is isolated to a single section of the pattern. In some embodiments, the colors each take up equal space within the pattern sections, whereas in other embodiments the color distribution may not be equal. For example, within the various backgrounds illustrated in FIG. 9B, each color takes up an equal amount of space within the respective patterns.

All images presented in this work were obtained with off-the-shelf optical components and a standard C-mount machine vision camera. If implemented with optical relays, FCS diagnostics typically does not require camera modifications and thus can be realized with any camera system (e.g. high-speed cameras, consumer-grade DSLR and compact cameras). The introduction of digital visual display media to display the source image renders the technique highly flexible, where setup time and calibration time can be minimized as all calibrations and adjustments are done in software. Due to the integration of a computer-controlled background with images captured by the camera, the technique is no longer limited to experimental geometries dictated by fixed grids, and the settings can be easily tuned to specific requirements. Once calibration algorithms are appropriately implemented, exacting physical alignment and calibration procedures can be replaced by software routines, i.e. Focusing (Color) Schlieren systems can be easily set up and operated even by an inexperienced user.

In some configurations, calibrating the system may include a color calibration, which might include, for example, a white balance. White balancing may be accomplished by calibrating the system such that the transmitted light, light which is not obstructed by the cutoff image, mixes into a desired color/hue, preferably white/gray, once lens blur is applied. To achieve this result slight offsets and/or brightening of individual colors of the background may be performed, similar results may be achieved by making modification/shifting the overlay image. The color calibration may improve the process of brightening colors as a camera sensor and digital display media may have slight differences in color interpretation.

Figure 4:
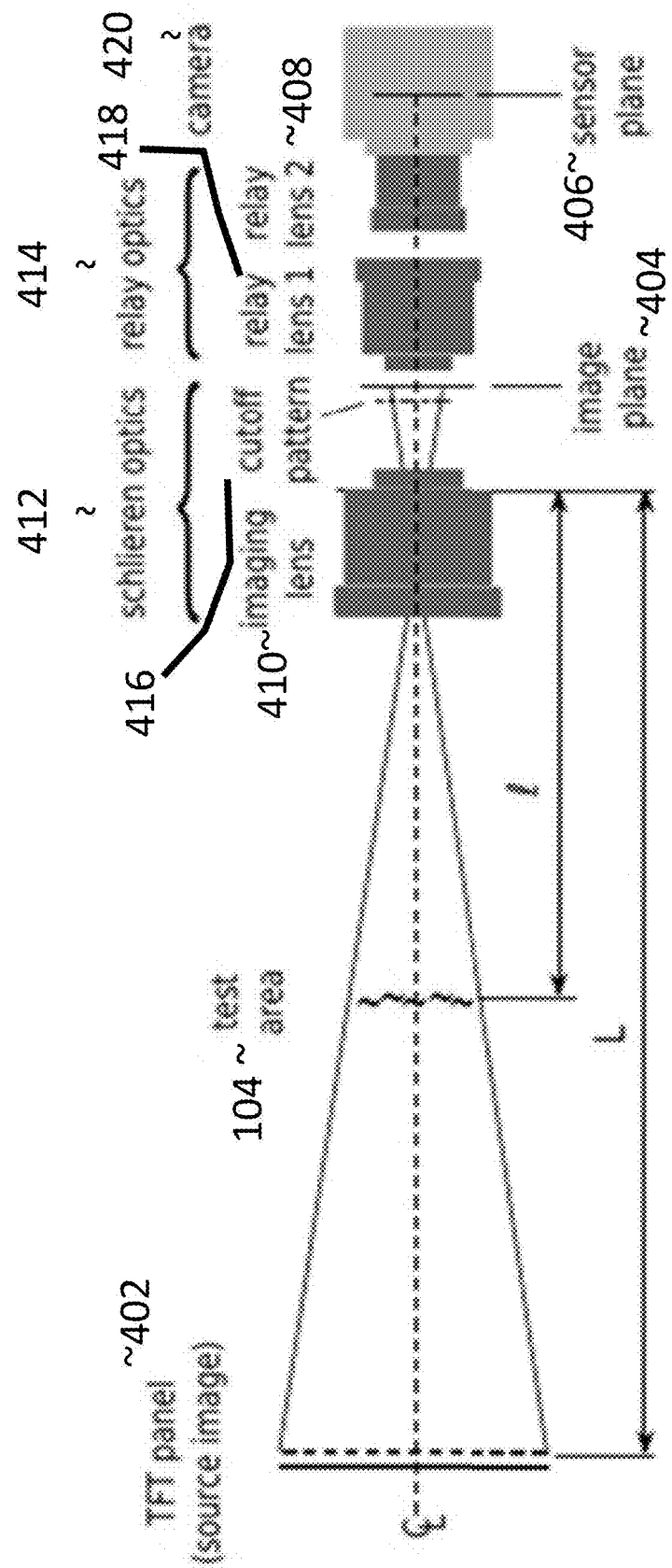
FIG. 4 is an exemplary schematic illustration of a focusing color Schlieren setup used embodiments of in the present invention.

FIG. 4 shows an exemplary schematic illustration of a focusing color Schlieren setup which can be used to practice the present invention. All Schlieren images presented herein were obtained, and can be obtained, using off-the-shelf components. For example, Standard F-mount prime lenses (50 mm f/1.4 or 85 mm f/1.4) and C-mount lenses can be used for imaging lens 410 and relay optics 414, respectively. Relay optics 414, including both relay lens 1 418 and relay lens 2 408, can be used to simplify focusing, despite known negative impacts on image circle size, resolution and overall imaging speed. The ratio of source distance L to object distance l is chosen as L/l=2, where distances are measured from the F-mount flange of the imaging lens 410 for simplicity. The source distance L is set to 0.6 m for the 50 mm lens. In order to hold the image magnification constant, L is increased to 1.05 m for the 85 mm lens.

Images were captured with a USB 3.0 machine vision camera (1936×1216 pixel CMOS sensor) 420, where all lenses were kept wide open (i.e. set to smallest f-stop). Source images 402 can be displayed on a high-resolution 9.7" TFT panel (2048×1536 pixels, 10.4 pixels/mm) and matched to a fixed cutoff pattern 416 (polka dot beam splitter; 56 μm pitch, 50% blockage). The image plane 404 can be located between the cutoff pattern 416 and the relay optics 414. Machine vision camera 420 (with sensor plane 406) and TFT panel 402 can be run from a dedicated PC, where the PC is specifically configured to provide color gradients based on the distinctions detected. Background patterns are calculated on-the-fly based on the fixed cutoff pattern 416 and displayed on the TFT panel 402 in real time. This approach gives complete flexibility in terms of background patterns, that is, the user can establish backgrounds, colors, and cutoff patterns as needed for specific scenarios. In addition, manual calibration can be avoided, as background images can be calculated for arbitrary source distances L, i.e. all calibration can be performed in software. Unless noted otherwise, the Figures were not digitally enhanced, i.e. they were not modified and represent images as captured by the camera sensor 420.

Figure 5A:
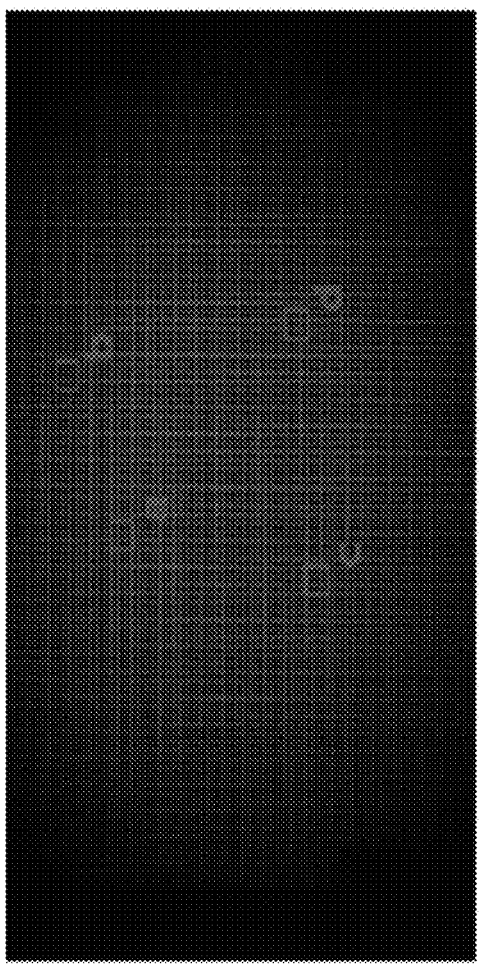
FIG. 5A shows a first example of an overview of a cutoff pattern and source image in focus.
Figure 5B:
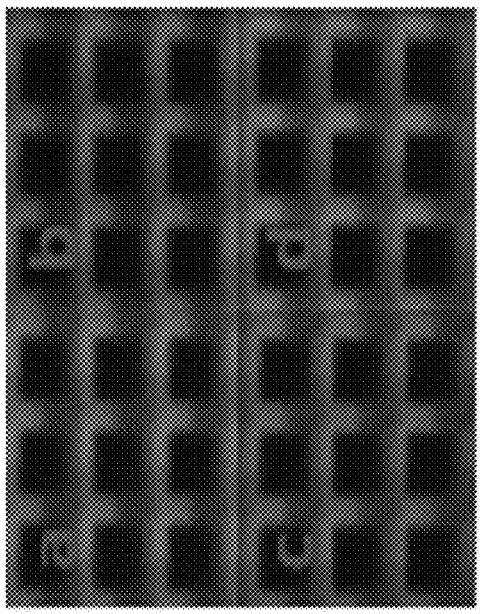
FIG. 5B shows details of FIG. 5A, out of focus.
Figure 5C:
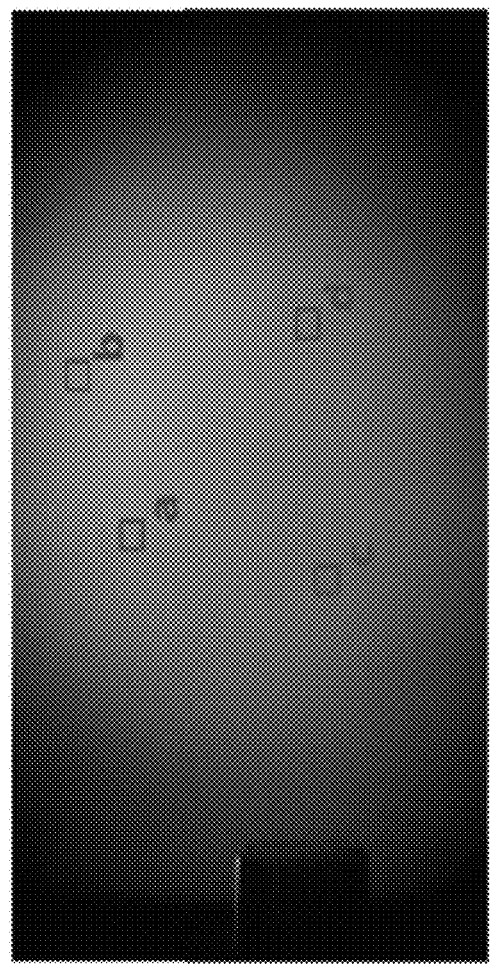
FIG. 5C shows a second example of an overview of a cutoff pattern and source image.
Figure 5D:
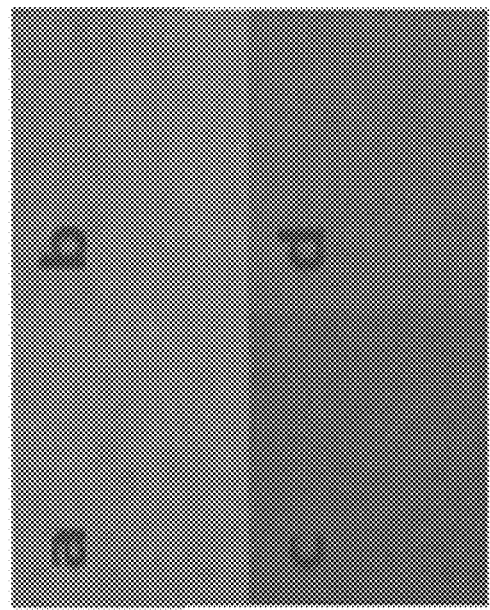
FIG. 5D illustrates details of FIG. 5C.

As complementary colors mix to white, lens blur (Bokeh effect) makes sure that a suitably defined, but out-of-focus background pattern appears as a neutral hue on the image plane. The background pattern is, however, focused on the cutoff pattern, where beam deviations due to refraction result in shifts of respective color intensities. FIGS. 5A, 5B, 5C, and 5D illustrate this effect, where a slight misalignment of cutoff pattern and source image produces transitions of color hue. Both pairs of photographs use identical alignments, where either (1) both the cutoff pattern and the source image are in focus (FIG. 5A and FIG. 5B), or (2) only the test area with the burner nozzle as the test subject is in focus (FIG. 5C and FIG. 5D). Magnified details within the photographs (respectively shown in FIGS. 5B and 5D) show that colors result from a partial blockage of the source image by the cutoff pattern. Within FIG. 5B, one can see that point "b" shows individual cutoff squares centered on the source image unit cells, cutoff squares are shifted towards the top right corner in detail "c", or to the top center in detail "d". It is noted that a perfectly aligned background will create a neutral hue, where a white-balance is required to obtain a blurred source image that appears gray. The technique is most sensitive within the depth of field, as lens blur results in faded colors for Schlieren features that are out of focus.

Figure 6:
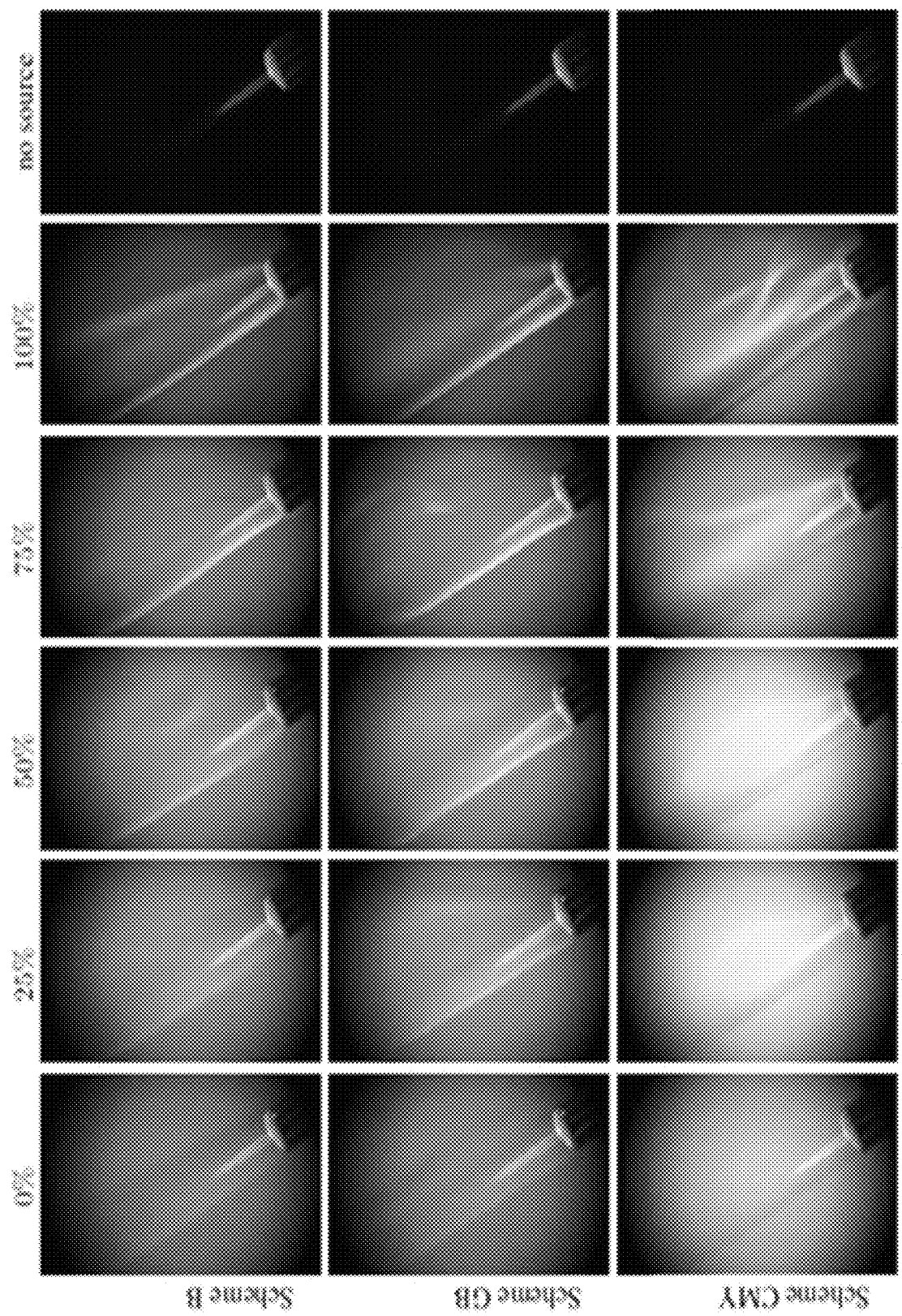
FIG. 6 shows Schlieren imaging results as a function of contrast percentage.

Schlieren imaging results can also be affected by the (optional) overlay grid that is superimposed on the source image. FIG. 6 illustrates the impact of contrast percentage, where a lit butane torch with a surrounding plume of hot gases serves as the test subject. A series of five images was taken with contrast percentages ranging from 0% to 100% across all three color schemes described herein. For image uniformity, the background illumination was held constant in all cases, i.e., background colors were brightened as the contrast percentage increased. In addition, one image of the flame without source image (i.e. a black background) was included as a control (the no source column). All image series were taken with a 4 ms exposure. The results clearly show a brightening of colors as the contrast percentage increases, which is consistent with expectations. Comparing schemes, CMY appears somewhat brighter due to the use of secondary colors (mix of two primary colors). Also, it is clearly evident that refraction in opposite direction produces complementary colors, which is a direct result from directional color coding used in focusing color Schlieren.

Figure 7:
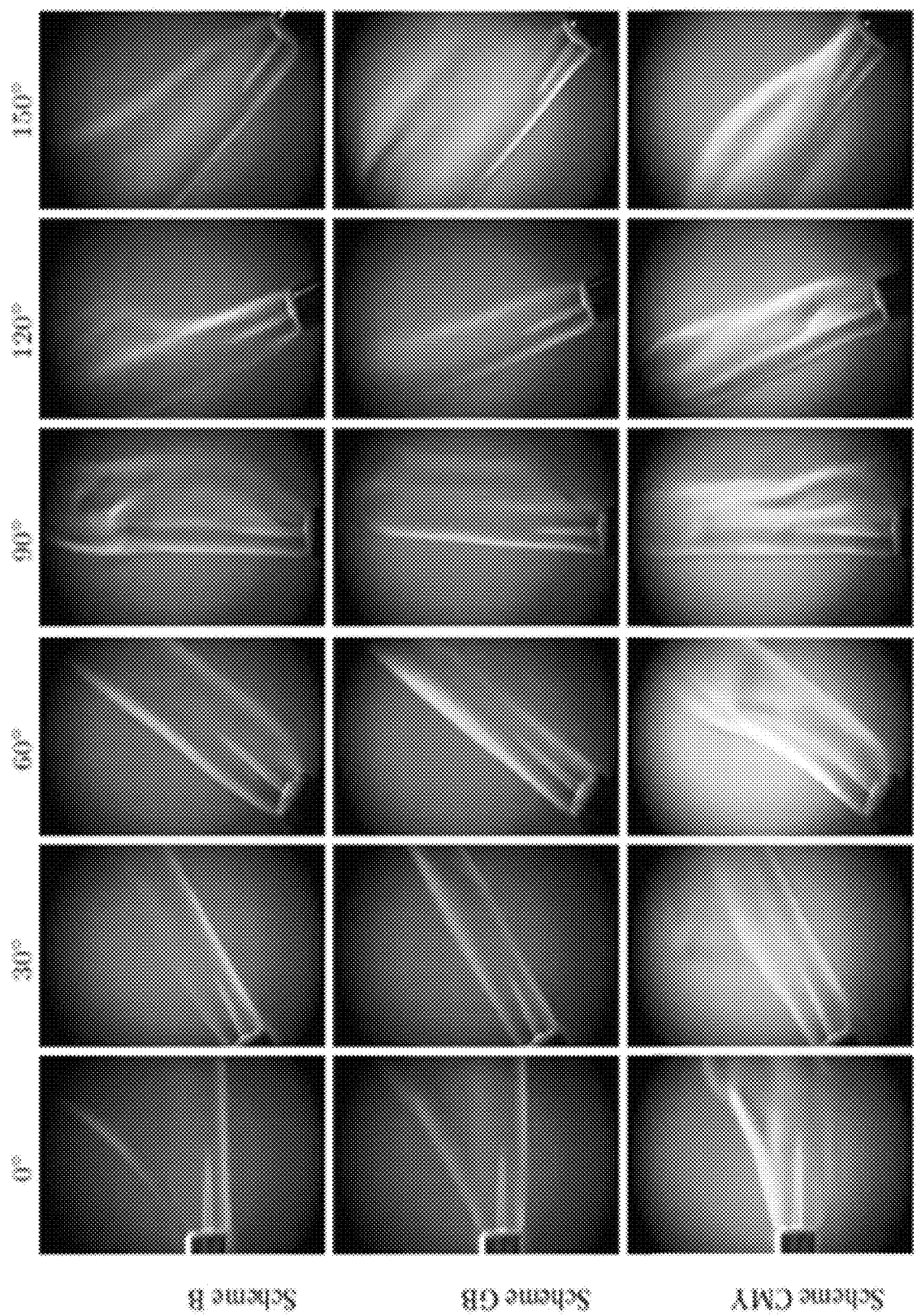
FIG. 7 shows directional dependence of color coded ray deflection.

FIG. 7 further illustrates the effect of directional color coding of the FCS method for different color schemes, where the butane torch was rotated without otherwise modifying the optical alignment. Again, images were captured using a 4 ms exposure, where the contrast percentage was held at 100%. Despite a colored background hue caused by a small offset in source image and cutoff pattern, results clearly demonstrate changes in color with respect to the direction of the flame. During the rotation of the flame, both sides of the hot plume shift colors, where specific variations depend on the color scheme. Comparing schemes, GB shows the least variation, where in particular the shift between blue and green lacks directional sensitivity. Scheme B produces good colors, but like GB lacks distinct yellow features, which is attributed to an offset of the cutoff pattern towards the upper right corner of the unit cell of the source image. CMY shows the smoothest variation of color, which is attributed to colors being evenly distributed on the color star (FIG. 2) and the scheme being less susceptible to shifts in alignment.

Figure 8:
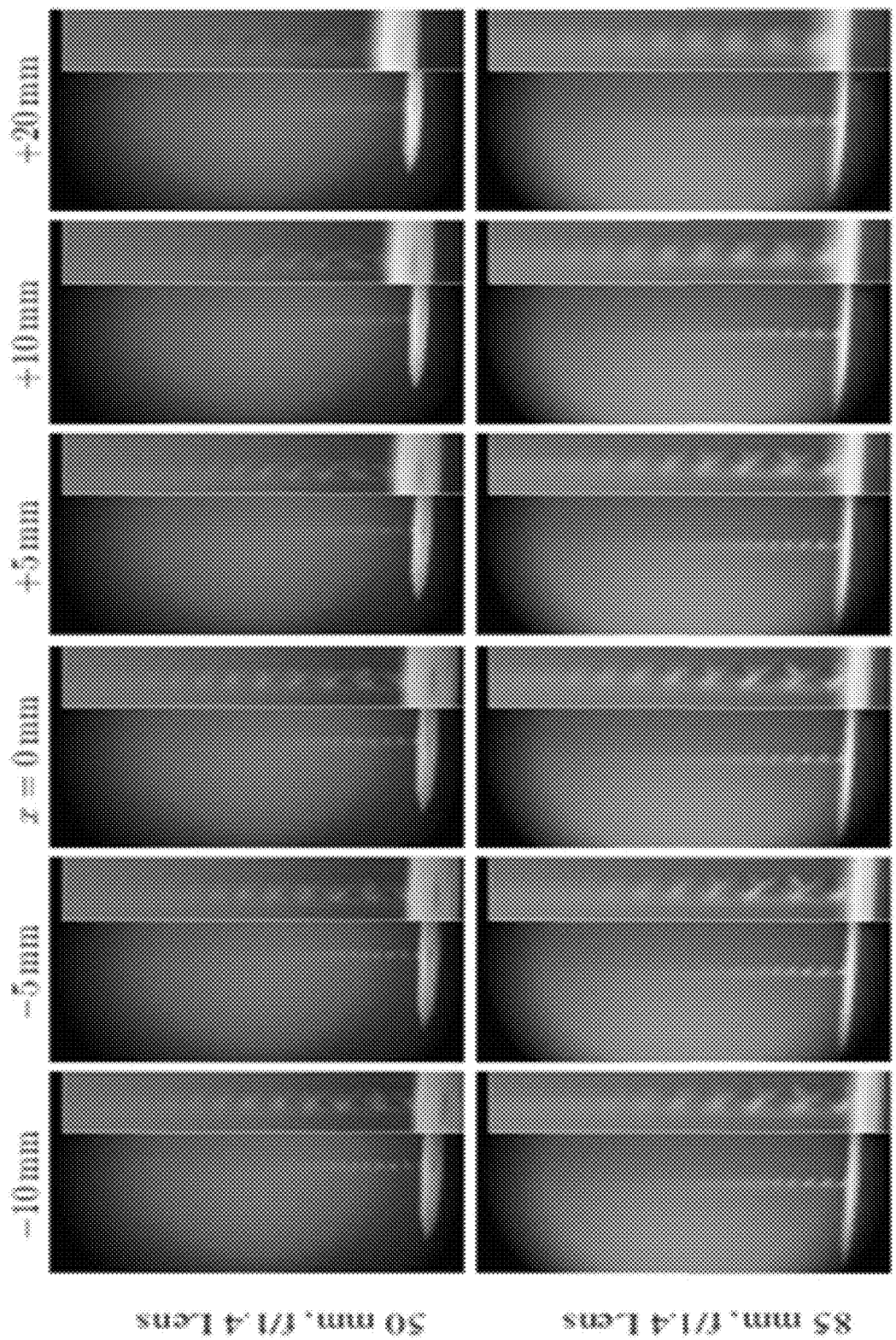
FIG. 8 shows an illustration depth of field as a function of focal length of the imaging lens; image insets show details with a magnification of 250%.

FIG. 8 illustrates the depth of field as a function of focal length of the imaging lens, where the test subject—an under-expanded jet emerging from a nozzle with a throat diameter of 1.6 mm—was translated on a linear stage in and out of the focal plane. For each respective image, the under-expanded jet is illustrated twice, with the "zoomed" in image of the jet on the right. Exposure times were 4 ms and 5 ms for 50 mm, f/1.4 and 85 mm, f/1.4 lenses, respectively, and contrast ratio was 100%. For both lenses, the shock appears in focus for displacements of −5/0/5 mm, but starts to fall out of focus after being shifted beyond in either direction, where the loss of sharpness is more pronounced for positive displacements. Further, the 50 mm lens captured a sharper shock at a displacement of +20 mm than did the 85 mm lens. This suggests that the depth of field decreases as the focal length increases, which is the expected behavior.

FIGS. 9A, 9B, and 9C have already been described above, and illustrate various backgrounds and cutoffs which can be combined as needed to form specific shapes or configurations.

Figure 10:
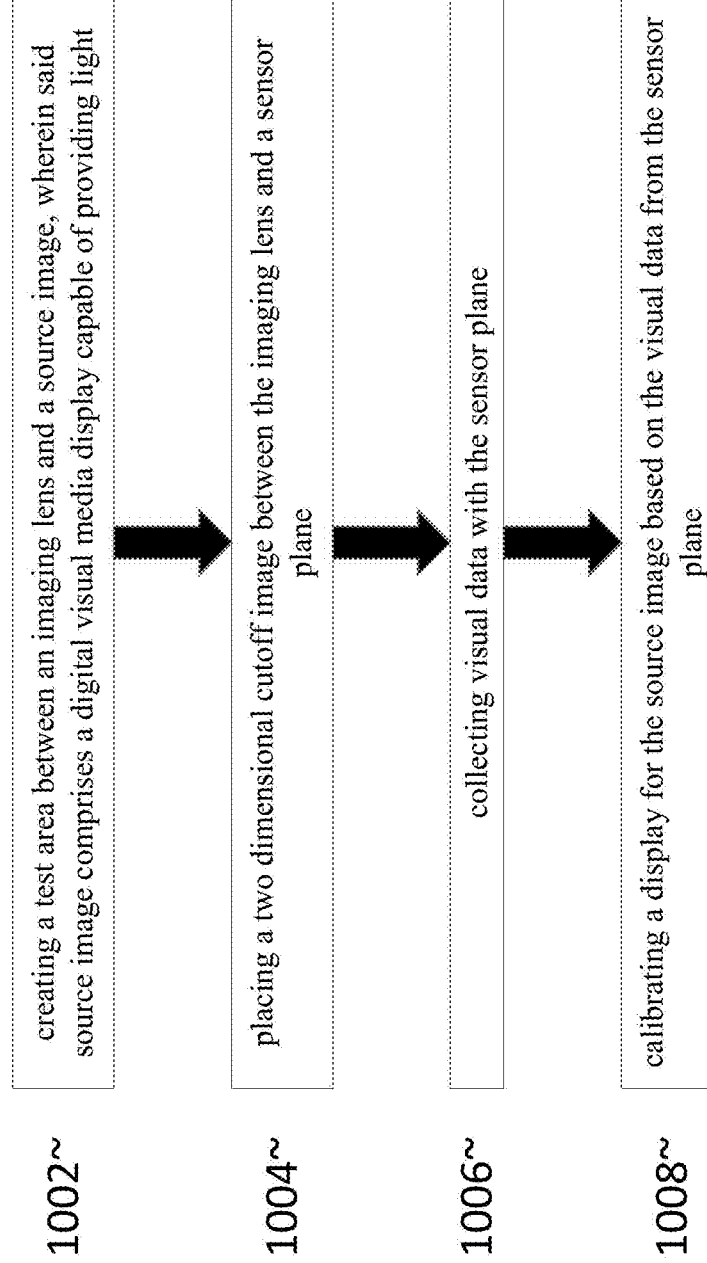
FIG. 10 illustrates an exemplary method for practicing the concepts disclosed herein.

FIG. 10 illustrates an exemplary method for improved Schlieren imaging. In this example, the system performing the method creates a test area between an imaging lens and a source image, wherein said source image comprises a digital visual media display capable of providing light (1002). The system places a two dimensional cutoff image between the imaging lens and a sensor plane (1004) and collects visual data with the sensor plane (1006). The system then calibrates a display for the source image based on the visual data from the sensor plane (1008).

In some configurations, light generated by the digital visual media display can be polychromatic.

In some configurations, the two dimensional cutoff image comprises a pattern of non-contiguous shapes (that is, the non-contiguous shapes are unconnected/don't touch one another). In other cases, the pattern can be contiguous. For example, the pattern may include shapes which are connected at a corner, by a line, overlaid on one another, etc. Exemplary shapes can include triangles, hexagons, parallelograms, circles, or combinations thereof.

In some configurations, the method can be augmented to further include performing a color calibration between the source image and the sensor plane prior to collecting the visual data.

In some configurations, the source image can further include a polychromatic background. This polychromatic background can include a first pattern of non-contiguous shapes. In this configuration, the two dimensional cutoff image can include a second pattern of non-contiguous shapes, the first pattern being identical to the second pattern.

Other exemplary methods and systems can likewise be performed and configured according to this disclosure. In a first example, an optical system can include: a source image capable of providing light; an imaging lens positioned to face light from the source image; and a cutoff image configured to create an image of refracted light (Schlieren) on an image plane, wherein the source image is a digital visual display media. In this example, the light source can be configured to provide light through the source image, or the source image can generate light. The cutoff image can be a transparent area and/or an opaque area (i.e., it may have parts which are transparent, parts which are opaque, or entirely one or the other). In some cases, multiple opaque areas can create a pattern, such as polygons, triangles, rectangles, hexagons, or circles. The source image can include at least one of a background for providing light, and the background can be made of multiple sections. These sections can form a second pattern which may (or may not) be complimentary to the first pattern, and can likewise have polygons or other shapes within the pattern. Likewise, the source image can be a background with areas which provide light and areas which do not provide light. The light from this background can be polychromatic, meaning the light can have a variety of colors (i.e., composed of more than one wavelength; i.e., is not monochromatic). The light from the background can form a pattern which may be non-contiguous, or otherwise discretely separated, by shapes or patterns. The colors from the background can be arranged according to the RGB color wheel, where the colors are evenly distributed within the background. In other configurations, the colors can be offset from one another by about 180° on the RGB color wheel (complementary colors), or about 120° on the RGB color wheel. The sensor plane can be used to record the image, and can, for example, be a camera or other recording device.

In a second additional example, a method of calibrating an optical system can include: creating a test area between an imaging lens and a source image, wherein said source image comprises a digital visual media display capable of providing light; placing a cutoff image between the imaging lens and a sensor plane; collecting visual data with the sensor plane; and calibrating the display for the source image from the visual data from the sensor plane to create an optical system configured to view an image of a Schlieren. In this example, the light from the source image can be polychromatic. The color calibration can include performing a color calibration, such as a white balance, offsetting a color of light provided by the source image, adjusting the brightness of the light provided by the source image, and/or modifying a dark area on the source image which does not provide light (i.e., shifting the dark area). The color calibration can be performed such that when lens blur is applied, light which reaches the sensor plane is a desired color/hue. For example, the light which reaches the sensor can be a desired color/hue of white/gray.

In a third additional example, a method of imaging a Schlieren can include: creating a test area between an imaging lens and a source image, wherein said source image comprises a digital visual media display capable of providing light; placing a cutoff pattern between the imaging lens and a sensor plane; collecting visual data with the sensor plane; and capturing an image of a Schlieren in the test area. Again, in this example, the light would be polychromatic.

In a fourth additional example, an optical system can include: a source image capable of providing light; an imaging lens positioned to face light from the source image; and a cutoff image configured to create an image of refracted light (Schlieren) on an image plane, wherein the source image is a digital visual display media. The cutoff image can have a first pattern, and the source image can be one of a background for providing light and a dark area which does not provide light. The dark area can be a compliment to the first pattern, a negative to the first pattern, match the first pattern, and/or form a second pattern. The second pattern can include polygons or other shapes. The source image can include a background for providing light, as well as a dark area which does not provide light. The light provided can be polychromatic. The background can include multiple sections, where the sections again have shapes, patterns, color differences, are discretely separated (i.e., are non-contiguous), and/or are arranged according to their location in the RGB color wheel (i.e., evenly distributed, offset by ~180 degrees such that complimentary colors are used, offset by about 120° on the RGB color wheel), etc. For example, the colors used by the source image can include at least three colors.

Figure 11:
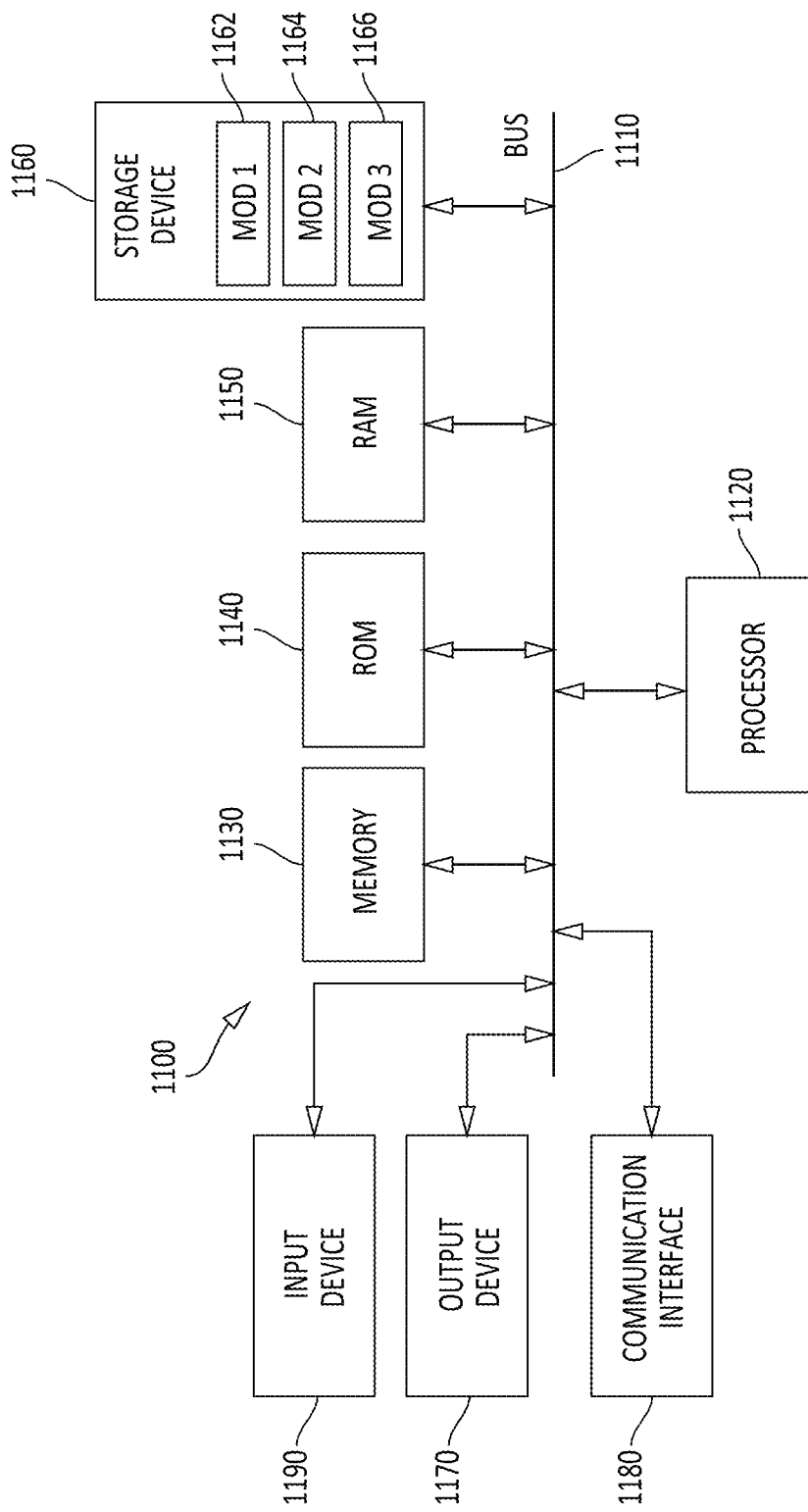
FIG. 11 illustrates an exemplary computer system.

With reference to FIG. 11, an exemplary system includes a general-purpose computing device 1100, including a processing unit (CPU or processor) 1120 and a system bus 1110 that couples various system components including the system memory 1130 such as read-only memory (ROM) 1140 and random access memory (RAM) 1150 to the processor 1120. The system 1100 can include a cache of high-speed memory connected directly with, in close proximity to, or integrated as part of the processor 1120. The system 1100 copies data from the memory 1130 and/or the storage device 1160 to the cache for quick access by the processor 1120. In this way, the cache provides a performance boost that avoids processor 1120 delays while waiting for data. These and other modules can control or be configured to control the processor 1120 to perform various actions. Other system memory 1130 may be available for use as well. The memory 1130 can include multiple different types of memory with different performance characteristics. It can be appreciated that the disclosure may operate on a computing device 1100 with more than one processor 1120 or on a group or cluster of computing devices networked together to provide greater processing capability. The processor 1120 can include any general purpose processor and a hardware module or software module, such as module 1 1162, module 2 1164, and module 3 1166 stored in storage device 1160, configured to control the processor 1120 as well as a special-purpose processor where software instructions are incorporated into the actual processor design. The processor 1120 may essentially be a completely self-contained computing system, containing multiple cores or processors, a bus, memory controller, cache, etc. A multi-core processor may be symmetric or asymmetric.

The system bus 1110 may be any of several types of bus structures including a memory bus or memory controller, a peripheral bus, and a local bus using any of a variety of bus architectures. A basic input/output (BIOS) stored in ROM 1140 or the like, may provide the basic routine that helps to transfer information between elements within the computing device 1100, such as during start-up. The computing device 1100 further includes storage devices 1160 such as a hard disk drive, a magnetic disk drive, an optical disk drive, tape drive or the like. The storage device 1160 can include software modules 1162, 1164, 1166 for controlling the processor 1120. Other hardware or software modules are contemplated. The storage device 1160 is connected to the system bus 1110 by a drive interface. The drives and the associated computer-readable storage media provide non-volatile storage of computer-readable instructions, data structures, program modules and other data for the computing device 1100. In one aspect, a hardware module that performs a particular function includes the software component stored in a tangible computer-readable storage medium in connection with the necessary hardware components, such as the processor 1120, bus 1110, display 1170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1100 is a small, handheld computing device, a desktop computer, or a computer server.

Although the exemplary embodiment described herein employs the hard disk 1160, other types of computer-readable media which can store data that are accessible by a computer, such as magnetic cassettes, flash memory cards, digital versatile disks, cartridges, random access memories (RAMs) 1150, and read-only memory (ROM) 1140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1100, an input device 1190 represents any number of input mechanisms, such as a microphone for speech, a touch-sensitive screen for gesture or graphical input, keyboard, mouse, motion input, speech and so forth. An output device 1170 can also be one or more of a number of output mechanisms known to those of skill in the art. In some instances, multimodal systems enable a user to provide multiple types of input to communicate with the computing device 1100. The communications interface 1180 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (e.g., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A system for Schlieren imaging, comprising:
    a source image comprising a digital visual media display capable of providing light;
    an imaging lens;
    a test area located between the imaging lens and the source image;
    a two dimensional cutoff image located between the imaging lens and a sensor plane, the two dimensional cutoff image comprising a pattern of shapes comprising at least one of hexagons or circles;
    a processor; and
    a non-transitory computer-readable storage medium having instructions stored which, when executed by the processor, cause the processor to perform operations comprising:
    collecting visual data with the sensor plane; and
    calibrating a display for the source image based on the visual data from the sensor plane.

2. The system of claim 1, wherein the light is polychromatic.

3. The system of claim 1, wherein the pattern of shapes of the two dimensional cutoff image comprises contiguous shapes.

4. The system of claim 1, having additional instruction stored which, when executed by the processor, cause the processor to perform operations comprising:
    performing a color calibration between the source image and the sensor plane prior to collecting the visual data.

5. The system of claim 1, wherein the source image further comprises a polychromatic background.

6. The system of claim 5, wherein the polychromatic background comprises a first pattern of non-contiguous shapes.

7. The system of claim 6, wherein the two dimensional cutoff image comprises a second pattern of non-contiguous shapes, the first pattern being identical to the second pattern.

* * * * *